United States Patent
Shaaban et al.

(10) Patent No.: US 12,084,359 B1
(45) Date of Patent: Sep. 10, 2024

(54) SYNTHESIS OF POSITIVELY CHARGED HYDROGELS FOR ANIONIC POLLUTANT REMOVAL

(71) Applicant: KING FAISAL UNIVERSITY, Al-Ahsa (SA)

(72) Inventors: Saad Shaaban, Al-Ahsa (SA); Hany Mohamed Abd El-Lateef Ahmed, Al-Ahsa (SA); Kamal Shalabi, Al-Kharj (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/403,431

(22) Filed: Jan. 3, 2024

(51) Int. Cl.
- *C02F 1/28* (2023.01)
- *C08L 97/02* (2006.01)
- *C02F 101/20* (2006.01)
- *C02F 101/30* (2006.01)

(52) U.S. Cl.
CPC ............ *C02F 1/286* (2013.01); *C08L 97/02* (2013.01); *C02F 2101/20* (2013.01); *C02F 2101/30* (2013.01)

(58) Field of Classification Search
CPC .. C02F 1/286; C02F 2101/20; C02F 2101/30; C08L 97/02
USPC ........................................................ 530/500
See application file for complete search history.

(56) References Cited

U.S. PATENT DOCUMENTS

| 2008/0188636 A1* | 8/2008 | Argyropoulos | C08H 8/00 527/300 |
| 2014/0162345 A1* | 6/2014 | Eyal | C10L 1/026 127/29 |

FOREIGN PATENT DOCUMENTS

| CN | 110270317 B | 11/2021 |
| CN | 112934189 B | 12/2022 |

OTHER PUBLICATIONS

Yan Caola et al., "Lignocellulose based hydrogel sponge for cost-effective seawater desalination", 2023, DOI: 10.1051/e3sconf/202338504012.

Basma G. Alhogbi et al., Ihogbi, "Facile Preparation and Analytical Utility of ZnO/Date Palm Fiber Nanocomposites in Lead Removal from Environmental Water Samples", Aug. 30, 2022, DOI: 10.3390/molecules27175592.

Lili Zhang et al., "Synthesis of lignocellulose-based composite hydrogel as a novel biosorbent for Cu2+ removal" Oct. 6, 2018, DOI: 10.1007/s10570-018-2077-8.

* cited by examiner

*Primary Examiner* — David T Karst
(74) *Attorney, Agent, or Firm* — Nath, Goldberg & Meyer; Joshua B. Goldberg

(57) ABSTRACT

Lignocellulose based hydrogels (LCHs) derived from date palm (DP) waste that can be used to overcome water treatment challenges, as well as a preparation method and application thereof.

6 Claims, No Drawings

SYNTHESIS OF POSITIVELY CHARGED HYDROGELS FOR ANIONIC POLLUTANT REMOVAL

BACKGROUND

1. Field

The present disclosure relates to lignocellulose based hydrogels (LCHs) derived from date palm (DP) waste that can be used to overcome water treatment challenges in water-scarce areas.

2. Description of the Related Art

The Kingdom of Saudi Arabia (KSA) is the most water-scarce country in the world, with 89.5 cubic $m^3$/capita per year, which falls below the minimum water availability threshold, i.e., 500 $m^3$/capita per year. Fresh water in KSA is often contaminated by domestic and industrial discharges (e.g., heavy metals and undesirable minerals) and agricultural fertilizers. Therefore, freshwater availability is of utmost concern from the health point of view and the Kingdom's sustainable future.

Further, the high population growth rates, extreme overconsumption, limited water reservoirs, recurrent droughts, and insufficient renewable water sources lead to substantially high clean water demands in KSA. This burdens the KSA water and agriculture systems and necessitates an urgent improvement of the sustainable water supply in the Kingdom. Despite the efforts made to alleviate these issues, the remaining challenges are still tremendous.

On the other hand, KSA is amongst the countries heavily dependent on water desalination and remediation. However, this strategy is extremely expensive. It leads to severe environmental problems and public health threats owing to carbon emissions. Furthermore, traditional desalination and treatment technologies (e.g., thermal processes and reverse osmosis) also have limitations due to their high costs, non-biodegradability, and limited recyclability, making large-scale implementation difficult.

Accordingly, there is an immediate demand to develop more optimal and efficient desalination and remediation methods to provide a sustainable and cost-effective alternative to petrochemical-based absorbents.

SUMMARY

The present subject matter relates to adsorption processes using bio-based membranes, specifically those derived from lignocellulose, providing a technically and economically favorable approach to desalination and wastewater treatment. Specifically, the present subject matter relates to lignocellulose-based hydrogels (LCHs) derived from date palm (DP) waste, which offer great potential for addressing water treatment challenges in water-scarce areas like the Kingdom of Saudi Arabia (KSA).

The present lignocellulose-based hydrogels possess advantageous characteristics like biodegradability, affordability, and thermal stability as well as high adsorption capacity. Thus, the present products enable the removal of diverse contaminants, including toxic metals and organic pollutants like dyes and phenols, from water or wastewater.

The present subject matter also addresses waste management concerns associated with date palm waste, which is often burned or improperly disposed of, causing environmental pollution. The development of the present novel and efficient LCHs derived from DP will help the Kingdom to address water pollution concerns, promote sustainable waste management practices, and ensure a secure and healthy water supply in line with Vision 2030 goals.

In an embodiment, the present subject matter relates to a method for making a lignocellulose based hydrogel from date palm waste, the method comprising: obtaining date palm waste; isolating lignocellulose from the date palm waste to obtain isolated lignocellulose; treating the isolated lignocellulose with methacrylic anhydride in the presence of trimethylamine to obtain a lignocellulose incorporating methacrylate; purifying the lignocellulose incorporating methacrylate; copolymerizing the purified lignocellulose incorporating methacrylate with aziridine and 4,4'-diselanediyldianiline; and obtaining the lignocellulose based hydrogel.

In another embodiment, the present subject matter relates to a lignocellulose based hydrogel from date palm waste made according to the methods as described herein.

In an additional embodiment, the present subject matter relates to a method for removing contaminants from wastewater, the method comprising: contacting wastewater containing said contaminants with the lignocellulose based hydrogel as described herein; and removing said contaminants from the wastewater.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to adsorption processes using bio-based membranes, specifically those derived from lignocellulose, providing a technically and economically favorable approach to desalination and wastewater treatment. Specifically, the present subject matter relates to lignocellulose-based hydrogels (LCHs) derived from date palm (DP) waste, which offer great potential for addressing water treatment challenges in water-scarce areas like the Kingdom of Saudi Arabia (KSA).

The present lignocellulose-based hydrogels possess advantageous characteristics like biodegradability, affordability, and thermal stability as well as high adsorption capacity. Thus, the present products enable the removal of diverse contaminants, including toxic metals and organic pollutants like dyes and phenols, from water or wastewater.

The present subject matter also addresses waste management concerns associated with date palm waste, which is often burned or improperly disposed of, causing environmental pollution. The development of the present novel and efficient LCHs derived from DP will help the Kingdom to address water pollution concerns, promote sustainable waste management practices, and ensure a secure and healthy water supply in line with Vision 2030 goals.

In an embodiment, the present subject matter relates to a method for making a lignocellulose based hydrogel from date palm waste, the method comprising: obtaining date palm waste; isolating lignocellulose from the date palm waste to obtain isolated lignocellulose; treating the isolated lignocellulose with methacrylic anhydride in the presence of trimethylamine to obtain a lignocellulose incorporating methacrylate; purifying the lignocellulose incorporating methacrylate; copolymerizing the purified lignocellulose incorporating methacrylate with aziridine and 4,4'-diselanediyldianiline; and obtaining the lignocellulose based hydrogel.

In one embodiment of the present production methods, the isolated lignocellulose can be treated with an excess of the methacrylic anhydride.

In another embodiment of the present production methods, the purifying can be conducted by washing the lignocellulose incorporating methacrylate functionalities with ethanol followed by vacuum drying. In this regard, the purifying can be conducted at room temperature.

In an additional embodiment of the present production methods, the date palm waste I can be obtained from date palm trees grown in Saudi Arabia.

In a further embodiment of the present production methods, the lignocellulose based hydrogel can be positively charged.

In another embodiment, the present subject matter relates to a lignocellulose based hydrogel from date palm waste made according to the methods as described herein.

In an additional embodiment, the present subject matter relates to a method for removing contaminants from wastewater, the method comprising: contacting wastewater containing said contaminants with the lignocellulose based hydrogel as described herein; and removing said contaminants from the wastewater.

In one embodiment of the present methods for treating wastewater, the contaminants can be selected from the group consisting of toxic metals, organic pollutants, and a combination thereof. In this regard, the organic pollutants can be selected from the group consisting of dyes, phenols, and a combination thereof.

In certain embodiments, the toxic metals can be heavy metals. For example, the present methods can be carried out to remove $Pb^{2+}$ and $Cd^{2+}$ in water treatment. Accordingly, the present lignocellulose based hydrogel can act as a heavy metal adsorbent according to the presently described methods.

It is to be understood that the lignocellulose based hydrogel and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for making a lignocellulose based hydrogel from date palm waste, the method comprising:
   obtaining date palm waste;
   isolating lignocellulose from the date palm waste to obtain isolated lignocellulose;
   treating the isolated lignocellulose with methacrylic anhydride in the presence of trimethylamine to obtain a lignocellulose incorporating methacrylate;
   purifying the lignocellulose incorporating methacrylate;
   copolymerizing the purified lignocellulose incorporating methacrylate with aziridine and 4,4'-diselanediyldianiline; and
   obtaining the lignocellulose based hydrogel.

2. The method for making a lignocellulose based hydrogel from date palm waste of claim 1, wherein the isolated lignocellulose is treated with an excess of the methacrylic anhydride.

3. The method for making a lignocellulose based hydrogel from date palm waste of claim 1, wherein the purifying is conducted by washing the lignocellulose incorporating methacrylate functionalities with ethanol followed by vacuum drying.

4. The method for making a lignocellulose based hydrogel from date palm waste of claim 3, wherein the purifying is conducted at room temperature.

5. The method for making a lignocellulose based hydrogel from date palm waste of claim 1, wherein the date palm waste is obtained from date palm trees grown in Saudi Arabia.

6. The method for making a lignocellulose based hydrogel from date palm waste of claim 1, wherein the lignocellulose based hydrogel is positively charged.

* * * * *